(12) United States Patent
Hildebrand et al.

(10) Patent No.: US 7,907,634 B2
(45) Date of Patent: Mar. 15, 2011

(54) METHOD AND SYSTEM OF TRANSPORTING MULTIMEDIA SIGNALS

(76) Inventors: John G. Hildebrand, Lawrenceville, GA (US); Francisco Gonzalez, Atlanta, GA (US)

( * ) Notice: Subject to any disclaimer, the term of this patent is extended or adjusted under 35 U.S.C. 154(b) by 831 days.

(21) Appl. No.: 10/597,573

(22) PCT Filed: Jan. 31, 2005

(86) PCT No.: PCT/US2005/002641
§ 371 (c)(1),
(2), (4) Date: Oct. 4, 2007

(87) PCT Pub. No.: WO2005/074279
PCT Pub. Date: Aug. 11, 2005

(65) Prior Publication Data
US 2008/0256584 A1  Oct. 16, 2008

Related U.S. Application Data

(60) Provisional application No. 60/540,161, filed on Jan. 29, 2004, provisional application No. 60/598,241, filed on Aug. 3, 2004.

(51) Int. Cl.
H04H 20/28 (2008.01)

(52) U.S. Cl. .......... 370/487; 370/486; 725/114; 725/138
(58) Field of Classification Search .................. 370/392, 370/394, 345, 486, 478, 210, 537, 465, 208, 370/535, 389; 725/109, 100, 91, 32, 131, 725/39, 114; 386/95, 125, 124, 46
See application file for complete search history.

(56) References Cited

U.S. PATENT DOCUMENTS

| | | | |
|---|---|---|---|
| 6,130,898 A | 10/2000 | Kostreski et al. | |
| 6,876,852 B1 | 4/2005 | Li et al. | |
| 7,228,555 B2 * | 6/2007 | Schlack | 725/35 |
| 7,451,475 B1 * | 11/2008 | Oz et al. | 725/127 |
| 7,801,119 B2 * | 9/2010 | Sorenson et al. | 370/356 |
| 2002/0046406 A1 * | 4/2002 | Chelehmal et al. | 725/87 |
| 2002/0147978 A1 | 10/2002 | Dolgonos et al. | |
| 2002/0188958 A1 * | 12/2002 | Miller | 725/112 |
| 2003/0058887 A1 * | 3/2003 | Dworkin et al. | 370/470 |
| 2003/0200548 A1 * | 10/2003 | Baran et al. | 725/90 |
| 2005/0028206 A1 * | 2/2005 | Cameron et al. | 725/46 |
| 2005/0123001 A1 | 6/2005 | Craven et al. | |
| 2005/0138669 A1 * | 6/2005 | Baran | 725/111 |
| 2009/0138966 A1 * | 5/2009 | Krause et al. | 726/21 |

* cited by examiner

Primary Examiner — Michael J Moore, Jr.

(57) ABSTRACT

A method and system of transporting multimedia signals from a source 12 to customer equipment (CE) 14. The method and system being applicable to cable, telecommunications, and other systems where signals are transported from a source 12 to CE 14.

9 Claims, 2 Drawing Sheets

METHOD AND SYSTEM OF TRANSPORTING MULTIMEDIA SIGNALS

CROSS-REFERENCE TO RELATED APPLICATIONS

This application claims the benefit of U.S. provisional application Ser. No. 60/540,161 filed Jan. 29, 2004 and U.S. provisional application Ser. No. 60/598,241 filed Aug. 3, 2004.

BACKGROUND OF THE INVENTION

1. Field of the Invention

The present invention relates to methods and systems of transporting multimedia signals to customer equipment (CE).

2. Background Art

Cable, telecommunication, and other systems may provide multimedia signals to customer equipment (CE), such as televisions, computers, modems, multimedia terminal adapters (MTAs), settop boxes (STBs), and the like. The signals may relate to audio and video signals which are continuously broadcasted by cable and network television providers, such as NBC, ABC, ESPN, HBO, and/or data signals, such as those associated with network communications, television services, and the like.

Operators of such systems require architectures for supporting the transportation of such signals from one location to another.

SUMMARY OF THE INVENTION

One aspect of the present invention relates to a transport system for transporting signals to customer equipment (CE). The present invention contemplates a number of features and configurations for transporting the signals, including a system having a source configured to packetize the signals and a bi-directional data communication unit (BDCU) configured to integrate signals from the source according to data communication protocols used by the BDCU to communicate with the CE.

In accordance with one non-limiting aspect of the present invention, the system may further comprise a network communicator in communication with the source for transporting signals from the source to the BDCU. In more detail, the network communicator may be an internet protocol (IP) encapsulator configured to encapsulate signals from the source for transport over a packet switching network to the BDCU.

In accordance with one non-limiting aspect of the present invention, the system may relate to cable systems where broadcast television signals are transported to CE. In more detail, the system may include a headend configured to packetize the television signals, a cable modem termination system (CMTS) in communication with the headend for integrating the television packets into a DOCSIS transport, and CE configured to retrieve the packetized television signals from the DOCSIS transport. Optionally, the headend may include a multiplexer for combining the packetized television signals into a MPEG-2 transport for direct output to the CMTS or through a network communicator.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
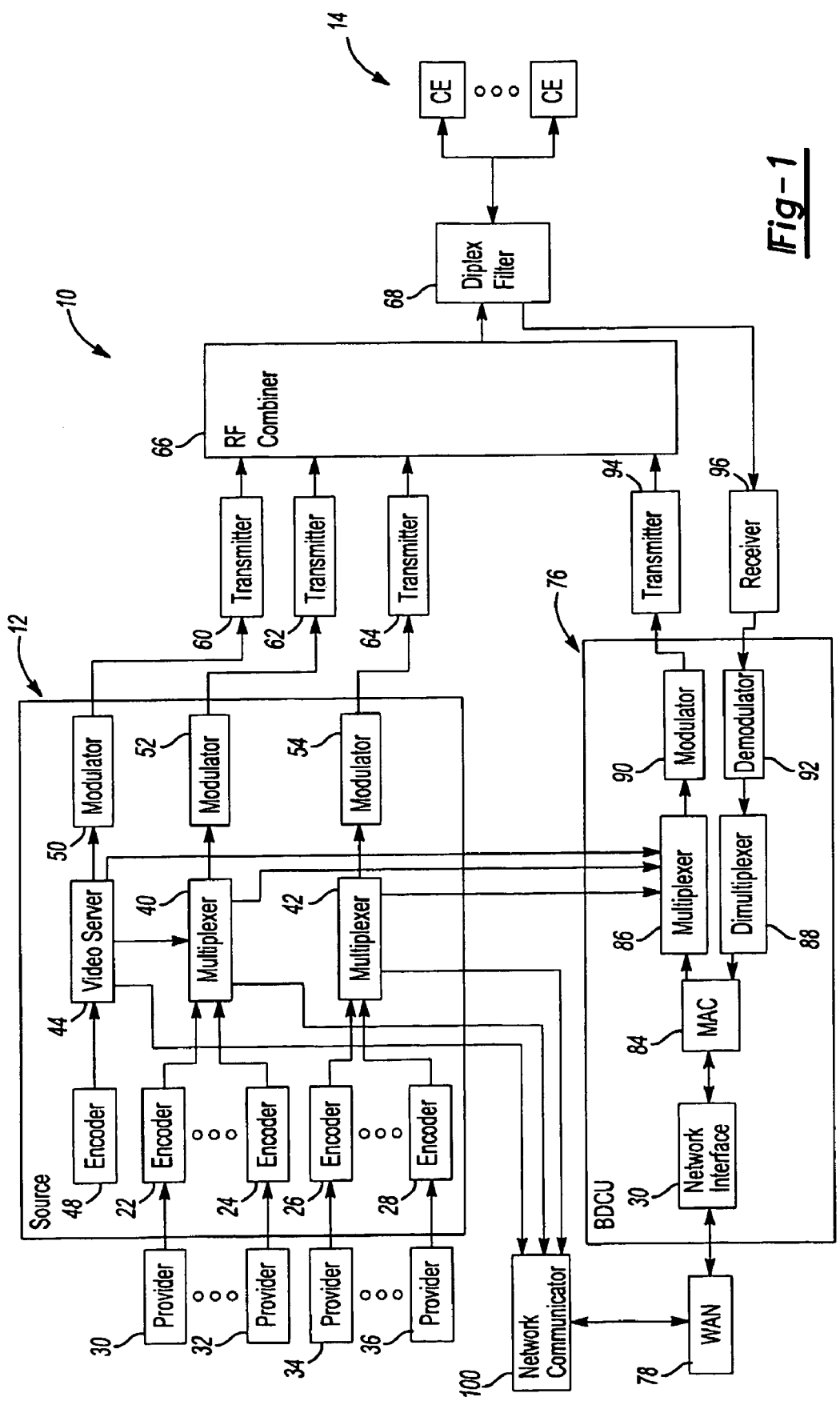
FIG. 1 illustrates a transport system in accordance with one non-limiting aspect of the present invention.

FIG. 1 illustrates a flexible transport system 10 in accordance with one non-limiting aspect of the present invention. The flexible transport system 10 provides an architecture for transporting multimedia signals from a source 12 to customer equipment (CE) 14, such as that associated with customers of a cable, telecommunication, and other service operators. Of course, the present invention contemplates any number of applications and is not intended to be limited to the foregoing systems.

In accordance with one non-limiting aspect of the present invention, the multimedia signals relate to broadcast television signals delivered to the source from a number of providers, such as network television providers like NBC, ABC, etc., cable television providers like HBO, ESPN, etc., pay-per-view providers, and the like. The broadcast television signals are characterized as being continuous broadcasts of video and audio signals that the source 12 manipulates for transport to the CE 14.

In general, the system 10 provides a flexible transport architecture for transporting broadcast television signals to a television, a settop box, a computer, a modem, a multimedia terminal adapter (MTA), a digital video recorder (DVR), and other types of CE 14. Of course, the present invention contemplates the source being associated with any type of service provider and configured for providing signals operable with any type of CE 14, including CE 14 which operate in combination with other features, such as local area networks (LANs) and media output devices.

The source 12 includes a number encoders 22-28 configured to receive signals from a number of providers 30-36. The encoders 22-28 continuously packetize, encode or otherwise manipulate the incoming audio and visual (AV) signals according to desired compression protocols and transport logic. For example, the encoders 22-28 may be MPEG encoders configured for compressing and encoding the AV signals according to MPEG protocols. Of course, the present invention is not intended to be limited to MPEG encoders and their associated protocols. Rather, the present invention contemplates any number of protocols, including advance video compression standards, such as MPEG-4 and H.264.

The encoded signals are outputted to one of a number of multiplexers 40-42 for combination into a common transport stream, typically referred to as a multiple program transport stream (MPTS). The MPTS may take any number of forms, including an MPEG-2 transport or other transport. Typically, each multiplexer 40-42 supports up to 10 or more encoders.

Of course, any number of other service signals may be multiplexed with the encoded broadcast television signals and included within the MPTS. For example, the source 12 may further include a streaming video server 44 for including previously stored video or video received from encoder 48 with the MPTS of broadcast television signals, such as to provide video on demand (VOD) capabilities and the like. Moreover, the video server 44 may be configured to multiplex multiple video sessions to create its own MPTS for output to the multiplexer 40 or elsewhere, as described below in more detail.

Likewise, additional information may be included in the MPTS, such as information identifying the programs, the program provider, and other information related to the broadcast television signals. In more detail, the source may include a program specific information/system information (PSI/SI) generator (not show) which receives instructions from providers, vendors, and/or operators at the source or in communication therewith for associating data and information signals with the broadcast television signals.

For example, the PSI generator may be configured to provide information regarding specific programs, such as detailed program descriptions, associated program authorizations, conditional access features, interactive tags, program (channel) listing, and the like. Likewise, the SI generator may be configured to provide less specific information, such as elementary stream program identifiers (such as those required to select specific programs from a multiple program transport stream), electronic programming guide (EPG) information, channel maps (in cable systems for example, each provider may be assigned a channel in a channel map which the customer may tune to with their CE to locate the associated television program or other service) content navigation information, tuning information (such as a frequency map of the system), presentation information and the like.

In accordance with one non-limiting aspect of the present invention, the MPTS and/or video server signals may be outputted from the multiplexers 40-42 to one of a number of modulators 50-54 for modulation, such as for quadrature amplitude modulation (QAM). In general, the modulation relates to associating the MPTS or video streams with a suitable transmission frequency. The modulators 50-54 output the modulated transport streams to one of a number transmitters 60-64 for upconverting to a suitable carrier frequency. The transmitters 60-64 output the signals to a radio frequency (RF) combiner 66 where the signals are combined with other signals for downstream transport to CE 14. A diplex filter 68 separates signals traveling in a downstream direction from those traveling in an upstream direction.

The signals output from the modulators 50-54 associated with the source generally define a transport architecture commonly referred to as baseline, which is mainly characterized by the multimedia signals being transported directly to the CE 14 from the source 12 and without further manipulation. This configuration is commonly found in systems which are unable to support packet switching network processes, such packet switching network commonly associate with internet protocols (IP) and the like.

In accordance with one non-limiting aspect of the present invention, the multiplexers 40-42 and video server 44 may output their respective MPTS to a bi-directional communication unit (BDCU) 76 configured for communicating data signals between CE 14 and a network 78, such as a wide area network (WAN). The BDCU 76 may include any number of features and components for supporting the bi-direction data communication between the CE 14 and network 78, including a network interface 82, a medium access control (MAC) 84, a multiplexer 86, a demultiplexer 88, a modulator 90, and a demodulator 92, such as those commonly found in a cable modem termination system (CMTS) of a cable system or a digital subscriber line access multiplexer (DSLAM) of a telecommunication system.

In operation, the BDCU 76 is configured to transport data signals between the CE 14 and network 78. For example, the BDCU 76 may be configured to transport signals according to a data over cable service interface specifications (DOCSIS) so that a cable modem, STB, or other data communication CE may exchange signals with the network 78. In more detail, the network interface 82 interacts with the network 78 to control the communication and exchanges of signals therebetween. The MAC 84 communications with the network interface 82 to control addressing and other functions related to communicating signals between the network 78 and CE 14.

In accordance with one non-limiting aspect of the present invention, the MPTS from the source multiplexers 40-42 and video server 44 may be communicated to the multiplexer 86 of the BDCU 76 for integration with the transport streams of the BDCU 76. In more detail, the AV packets of the MPTS are integrated with the data packets of the BDCU transport streams according the data transport protocols of the BDCU 76 to create an integrated transport stream. In this manner, the integrated signals may be transported to the CE 14 using data transmission protocols, such as those defined by DOCSIS.

In accordance with one non-limiting aspect of the present invention, the multiplexer 86 may combine signals from the source multiplexers 40-42 and video server 44 into an integrated MPEG-2 transport stream of 188 byte MPEG packets composed of a 4 byte header and 184 byte payload. In accordance with one non-limiting aspect of the present invention, the integrated transport stream differentiates AV packets from data packets using DOCSIS procedures and protocols, such as those included in a DOCSIS transmission convergence sub-layer. In more detail, this includes identifying data packets by a packet identifier (PID) 0x1FFE in the MPEG-2 transport header and without an associated adaptation field whereas the AV packets are identified with PIDs other than those having the 0x1FFE designation and are associated with an adaptation field for decoder synchronization. Of course, the present invention is not intended to be limited to the use of the DOCSIS downstream transmission convergence sub-layer and contemplates the use of other packet identifying logic for differentiating between AV packets and DOCSIS data packets.

The integrated transport stream may be outputted from the multiplexer 86 to the modulator 90 for modulation, such as quadrature amplitude modulator (QAM). The modulator 90 outputs the modulated transport stream to a transmitter 94 for upconverting to a suitable carrier frequency and delivery to the RF combiner 66. The BDCU 76 may also receive signals from the CE 14 through the use of a receiver 96, demodulator 92, and demultiplexer 94, as one skilled in the art will appreciate.

In accordance with one non-limiting aspect of the present invention, the system 10 may include a network communicator 100. The communicator may be configured for encapsulating or otherwise manipulating the MPTSs from the source multiplexers 40-42 and/or the video server 44 to network protocols. In this manner, the network protocols permit transmission of the MPTSs over packet switching networks, such as the WAN 78.

In accordance with one non-limiting aspect of the present invention, the network communicator 100 may be configured to convert, manipulate, or otherwise reconfigure the MPTS to any number of network protocols, such as internet protocols (IP) like user datagram protocols (UDP), transmission control protocols (TCP), real-time transport protocols (RTP), and the others. In this manner, the MPTS from the source multiplexers 40-42 and video server 44 may be delivered to the BDCU over the internet or other network without requiring dedicated communication lines therebetween. In more detail, such flexibility allows the source 12 to transfer the MPTS over any packet-switching network to the BDCU 76 where it can then be integrated, as described above, with the data transport streams of the BDCU and configured for transport to the CE 14.

As described above, the source multiplexers 40-42 and video server 44 may output the MPTSs directly to the RF combiner 66, to the multiplexer 86 of the BDCU 76, and/or to the network communicator 100. Such flexibility provides a flexible architecture for the transportation of signals from the source 12 to the CE 14. Of course, the present invention is not so limited and contemplates the use of other features at the source of BDCU for directing the multiplexing and transport of the signals.

Figure 2:
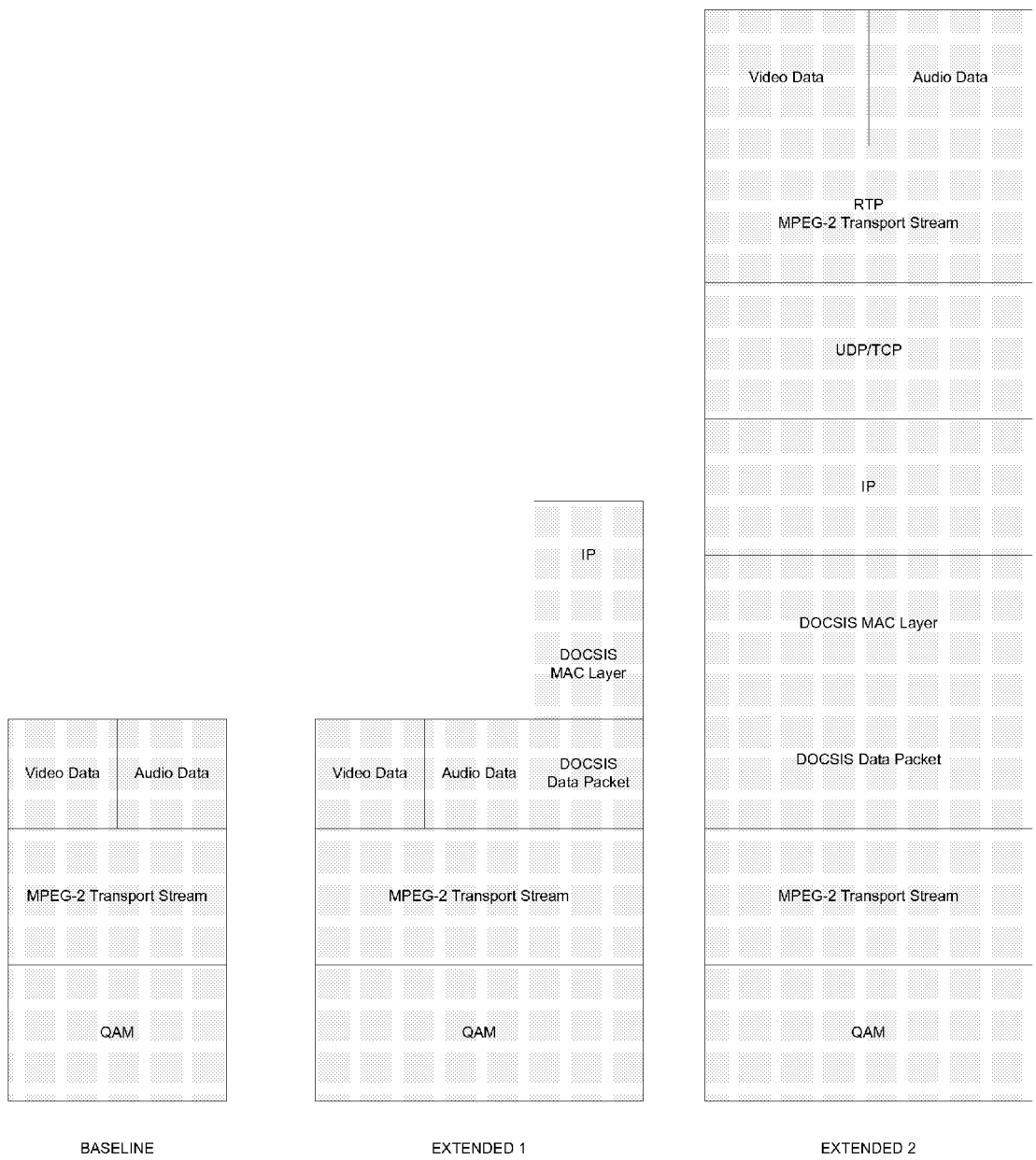
FIG. 2 illustrates example data packaging using a variety of protocols.

FIG. 2 illustrates three alternative data transport approaches to transport an MPEG-2 stream. A first means to carry MPEG-2 transport stream between the head-end edge (e.g. QAM or CMTS) and the subscriber premises can be a baseline stream comprising a multiplexed MPEG-2 Multiple Program Transport Stream (MPTS) over QAM. The ability to process MPEG-2 transport over QAM allows for backwards compatibility.

A second means to carry an MPEG-2 transport stream between the head-end edge and the subscriber premises can be referred to as an Extended 1 stream. This Extended 1 stream comprises multiplexed audio and visual (AV) program information with modem protocol data such as data over cable service interface specifications (DOCSIS) data. Packet identifier (PID) 0x1FFE can be used for MPEG-2 transport packets carrying the DOCSIS payload, and other PIDs can be used for other various video streams. This Extended 1 stream could be used in addition to the Baseline stream to support advanced video-based multimedia services that are integrated with data over cable services.

A third means to carry MPEG-2 transport stream between the head-end edge and the subscriber premises can be referred to as an Extended 2 stream. This Extended 2 stream comprises AV data carried over IP and delivered over modem protocol (e.g., DOCSIS) channels. This allows services such as IP-based streaming media to the digital set-top box. It is possible that AV data can be carried over MPEG-2 transport stream and/or real-time transfer protocol (RTP) or other protocols before the AV data is sent over transmission control protocol (TCP) or user datagram protocol (UDP) packets.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A transport system, the system comprising:
    an RF combiner configured to combine three video protocol streams carrying differently-encoded versions of the same audiovisual content to a consumer equipment, wherein a first one of the video transport protocol streams contains the audiovisual content directly encoded according to a video transport protocol; and
    a bi-directional data communication unit (BDCU) configured to provide second and third ones of the video protocol streams to the RF combiner, wherein the second one of the video protocol streams contains packets having payloads that contain a combination of the audiovisual content and other Internet Protocol data, and the third one of the video protocol streams contains packets having payloads that contain only the audiovisual content.

2. The system of claim 1, further comprising a source of the audiovisual content, wherein the source includes at least one multiplexer configured to combine a plurality of the packetized television signals into a multiple program transport stream (MPTS), and to transport the MPTS to the BDCU.

3. The system of claim 1 further comprising a video server configured to packetize streaming video and wherein the multiplexer of the BDCU is configured to integrate the packetized streaming video with packetized television signals and data signals for transport to consumer equipment (CE) in an integrated transport stream.

4. The system of claim 3 wherein the network communicator is configured to encapsulate the packetized streaming video for network communication and transport it to the BDCU.

5. A method of providing multimedia content from a source to consumer equipment (CE) comprising:
    encapsulating a first copy of audiovisual (AV) data as payload in packets according to a video transport protocol to form a first video transport stream;
    encapsulating Internet Protocol (IP) data as payload in packets according to a modem protocol, combining the modem protocol packets with a second copy of the AV data, and encapsulating the combination as payload in packets according to the video transport protocol to form a second video transport stream;
    encapsulating a third copy of the AV data as payload in packets according to the modem protocol, and encapsulating the modem protocol packets as payload in packets according to the video transport protocol to form a third video transport stream; and
    transmitting a combination of the three video transport streams from a common transmitter and onto a common medium.

6. The method of claim 5 further comprising configuring the IP data according to a real-time transport protocols (RTP) prior to encapsulation according to the modem protocol.

7. The method of claim 6 further comprising configuring the RTP-configured IP data according to user datagram protocols (UDP) or transmission control protocols (TCP) prior to encapsulation according to the modem protocol.

8. The method of claim 5, wherein the video transport protocol is an MPEG-2 protocols.

9. The method of claim 5, wherein the modem protocol is a data over cable service interface specifications (DOCSIS) transport protocol.

* * * * *